United States Patent [19]

Corrigan et al.

[11] Patent Number: 5,073,074
[45] Date of Patent: Dec. 17, 1991

[54] SET SCREW

[75] Inventors: Niall Corrigan, Hudson, Ohio; Gerry Keating, County Clare; Desmond Beegan, Limerick, both of Ireland

[73] Assignee: SPS Technologies, Inc., Newtown, Pa.

[21] Appl. No.: 558,981

[22] Filed: Jul. 26, 1990

[51] Int. Cl.[5] ............................................. F16B 35/00
[52] U.S. Cl. ................................... 411/393; 411/188; 411/959; 403/362
[58] Field of Search ............... 411/393, 167, 168, 187, 411/188, 959; 403/362

[56]  References Cited

U.S. PATENT DOCUMENTS

| 752,628 | 2/1904 | Miner | 411/959 |
|---|---|---|---|
| 1,330,792 | 2/1920 | Frick . | |
| 2,235,435 | 3/1941 | Koester . | |
| 2,245,525 | 6/1941 | Dicely . | |
| 2,295,314 | 9/1942 | Whitney . | |
| 2,314,274 | 3/1943 | Hallowell . | |
| 2,462,910 | 3/1949 | Simmons . | |
| 2,631,635 | 3/1953 | Klooz | 411/168 |
| 2,778,265 | 1/1957 | Brown . | |
| 2,907,245 | 10/1959 | Whitson . | |
| 2,992,669 | 7/1961 | Fesmire . | |
| 3,286,754 | 11/1966 | Klooz et al. . | |
| 3,419,058 | 12/1968 | Walker . | |
| 3,920,060 | 11/1975 | Heldmann et al. . | |
| 4,764,068 | 8/1988 | Crispell | 411/393 |

OTHER PUBLICATIONS

National Machinery Publication–"Tool Design and Part Shape Development for Multi-Die Cold Forming", 1976.

Primary Examiner—Neill R. Wilson
Attorney, Agent, or Firm—James D. Dee; Aaron Nerenberg

[57] ABSTRACT

This invention relates to a set screw comprising a shank having external threads and a work-engaging end portion integrally formed at one end of the shank. The work-engaging end portion has a frustohemispherical outer surface comprising a plurality of circumferentially spaced serrations in the form of teeth. Each of the teeth comprises a ramp extending outwardly from a root to a crest thereof with the ramp being inclined in a direction which is opposite to the direction of rotation of engaging the set screw in a workpiece. A cavity is formed in the outer extremity of the work-engaging end portion. The cavity cooperates with the frustohemispherical outer surface to form therebetween an annular wedge. The work-engaging end portion can be readily formed by a forging process.

20 Claims, 2 Drawing Sheets

SET SCREW

BACKGROUND OF THE INVENTION

1. Field of the Invention

This invention generally relates to set screws and, more particularly, to set screws of the "cup-point" type.

2. Description of the Prior Art

Set screws are used in various applications to removeably secure fly wheels, pinions, pulleys, cams, propellers and the like to shafts. In such applications, the set screws experience both vibrations and shock loads which might tend to loosen them.

Many set screw points have been designed in the past to increase the ability of the set screw to resist vibration. Examples of such set screws include: U.S. Pat. No. 1,330,792, Frick; U.S. Pat. No. 2,235,435, Koester; U.S. Pat. No. 2,245,525, Dicely; U.S. Pat. No. 2,462,910, Simmons; U.S. Pat. No. 2,778,265, Brown; U.S. Pat. No. 2,295,314, Whitney; U.S. Pat. No. 2,907,245, Whitson; U.S. Pat. No. 3,286,754, Klooz et al.; U.S. Pat. No. 3,419,058, Walker; and U.S. Pat. No. 3,920,060, Heldmann et al.

Of particular interest is U.S. Pat. No. 2,314,274, Hallowell, which discloses certain types of set screws having knurls on the work-engaging end wherein the work-engaging extremity is provided with centering means that will be effective to establish the position of the screw with the work prior to engagement of the interlocking means. Also, U.S. Pat. No. 2,992,669, Fesmire, discloses a certain knurled cup-point set screw wherein the cup is counter-bored Additionally, U.S. Pat. No. 4,764,068, Crispell, discloses a set screw having a threaded shank and a cup-point formed at one end of the shank wherein the cup-point has an outer frustoconical surface and an inner cylindrical surface which together define an annular wedge terminating in a circular edge. A portion of the outer frustoconical surface remote from the circular edge is provided with knurling.

Most of the above-mentioned prior art set screws have cup-point configurations formed by a machining process. However, none of these prior art references suggest the novel work-engaging end portion of the set screw of the present invention which can be formed by a forging process.

SUMMARY OF THE INVENTION

This invention relates to a set screw comprising a shank having external threads and a work-engaging end portion integrally formed at one end of the shank. The work-engaging end portion has a frustohemispherical outer surface comprising a plurality of circumferentially spaced serrations in the form of teeth. Each of the teeth comprises a ramp extending outwardly from a root to a crest thereof with the ramp being inclined in a direction which is opposite to the direction of rotation of engaging the set screw in a workpiece. A cavity is formed in the outer extremity of the work-engaging end portion. The cavity cooperates with the frustohemispherical outer surface to form therebetween an annular wedge.

The cavity can be generally conical or generally polyhedral in shape, having its largest diameter equal to and coterminous with the outermost periphery of the frustohemispherical outer surface. Additionally, the cavity can be defined by a first portion immediately interior to the outermost portion of the work-engaging end portion and comprising a generally cylindrical wall concentric with the longitudinal axis of the shank. The cavity can be also further defined by a second portion interior to the cylindrical first portion with the second portion being concentric with the longitudinal axis of the shank and being generally conical in shape, having its largest diameter equal to and coterminous with the innermost periphery of the cylindrical first portion. Moreover, the cavity formed in the work-engaging end portion can extend inwardly to a point in the shank beyond the work-engaging end portion.

The depth of each serration decreases towards the outermost periphery of the frustohemispherical outer surface. Advantageously, the teeth are curved and equally spaced about the frustohemispherical outer surface. The teeth of the present invention facilitate imbedding of the set screw in the workpiece when the set screw is rotated to engage the workpiece and the teeth further deter loosening of the set screw after engagement with the workpiece.

The rounded work-engaging end portion or "cup-point" configuration of the present invention allows its cup-point to be shorter than a straight knurl cup-point having the same cup and point diameters. Therefore, the threads on the shank are closer to the cup-point, which is particularly advantageous when the set screw's length is less than its diameter. Furthermore, the serrations are stronger at the outer edge of the cup-point where stress is high than it is on the side because the serration depth increases away from the edge. This allows the serrations to engage more of the mating surface of the workpiece when the serrations penetrate deep into the surface. The edge remains more durable because the serration depth is smaller at the cup-point edge. Additionally, the unique work-engaging end portion of the present invention can be readily and efficiently formed by a forging process.

Accordingly, it is an object of the present invention to provide a set screw having a novel work-engaging end portion configuration. It is a further object of the present invention to provide a work-engaging end portion which can be readily and efficiently formed on the shank by a forging process. It is also an object of the present invention to provide a novel set screw having more of the shank's threads near the outer edge. It is an additional object of the present invention to provide a work-engaging end portion configuration which is stronger at the outer edge where stress is higher.

These and many other objects, features and advantages of the present invention will become apparent to those skilled in the art when the following description of the preferred embodiments is read in conjunction with the drawings appended hereto.

BRIEF DESCRIPTION OF THE DRAWINGS

In the drawings, where like reference numerals refer to like elements throughout.

DESCRIPTION OF THE PREFERRED EMBODIMENTS

Figure 1:
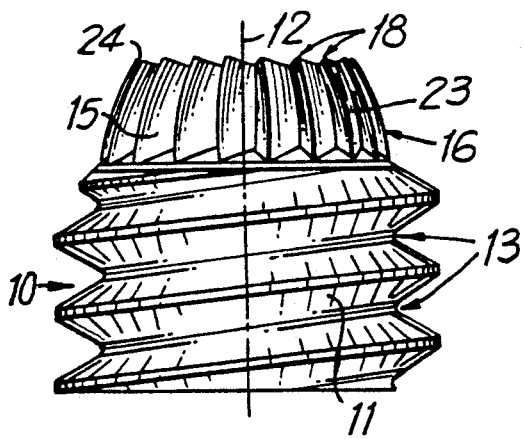
FIG. 1 is a side elevational view of the point or work-engaging end portion of the set screw in accordance with the present invention.
Figure 2:
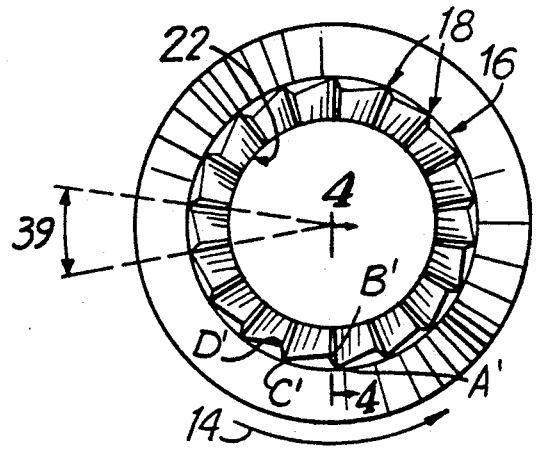
FIG. 2 is a top plan view of the set screw in accordance with the present invention.
Figure 3:
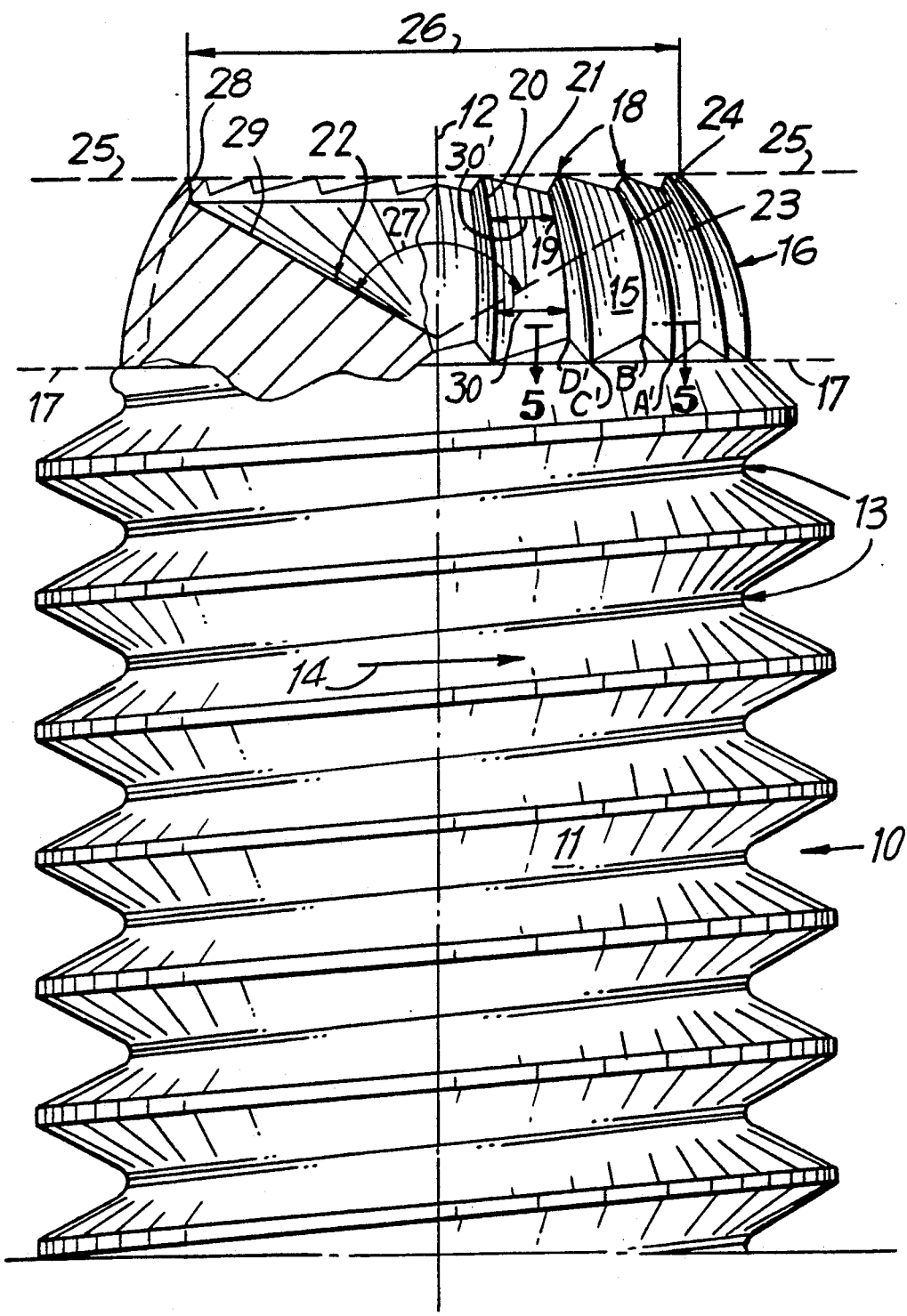
FIG. 3 is a partly cutaway side elevational view of the point or work-engaging end portion of the set screw in accordance with the present invention.

Referring now to the drawings, FIGS. 1 through 3 illustrate a set screw 10 adapted to engage a workpiece in accordance with the present invention. The set screw 10 is comprised of a shank 11 having a longitudinal axis 12 and external threads 13 along a substantial portion of the shank's length. The threads 13 define a direction of rotation of engaging the set screw 10 in the workpiece. In use, the set screw 10 is in threaded engagement with a member and is tightened in the member against a workpiece, such as a shaft or rod. The directional arrow 14 in FIGS. 2 and 3 shows the direction of rotation of engaging the set screw 10 as defined by the threads 13 for the embodiment of the present invention illustrated therein. In FIGS. 2 and 3, the direction of rotation is in a counterclockwise direction. However, the direction of rotation may also be in a clockwise direction as can be appreciated by those skilled in the art.

A cup-point or work-engaging end portion 15 is integrally formed at one end of the shank 11. A wrench receiving socket (not shown) of any desired configuration can be formed at the other end of the shank 11 for receiving a suitable screw rotating wrench so that the set screw 10 can be rotated for tightening against the workpiece. The work-engaging end portion 15 has a frustohemispherical outer surface 16. The term "frustohemispherical" as used herein means a half sphere-type configuration in which the top portion is cut off by a plane generally parallel to the base. In a preferred embodiment, the intersection of the outer surface 16 of the work-engaging end portion 15 and the shank 11 defines the end portion's base or a first plane 17 generally normal to the shank's longitudinal axis 12. Also, the frustohemispherical outer surface 16 is comprised of a plurality of circumferentially spaced serrations in the form of teeth 18. The serrations are radially disposed on the outer surface 16 in relation to the shank's longitudinal axis 12. The teeth 18 are curved and, advantageously, the teeth 18 are equally spaced about the outer surface 16. For example, the teeth 18 will be separated by an angle 39 of 20° if the screw 10 has a total of eighteen teeth, as illustrated in FIG. 2. However, the total number of teeth is not critical and may vary depending on the size and application of the screw, as can be appreciated by those skilled in the art.

Each of the teeth 18 is comprised of a root 19, a crest 20, and a ramp 21 extending outwardly in relation to the longitudinal axis 12 from the root 19 to the crest 20 thereof. Furthermore, the ramp 21 is inclined outwardly in a direction which is opposite to the direction of rotation of engaging the set screw 10 in the workpiece. For example, if the direction of rotation of engaging the set screw 10 in the workpiece is in a counterclockwise direction, then the ramp 21 is inclined outwardly in a clockwise direction, as illustrated in FIGS. 2 and 3. However, if the direction of rotation of engaging the set screw 10 in the workpiece is in a clockwise direction, then the ramp 21 is inclined outwardly in a counterclockwise direction. The orientation of the teeth 18 in relation to the direction of rotation of engaging the set screw 10 facilitates imbedding of the set screw 10 in the workpiece when the set screw 10 is rotated to engage the workpiece and also deters loosening of the set screw 10 after engagement with the workpiece.

A cavity 22 is formed in the outer extremity of the work-engaging end portion 15. The cavity 22 generally extends inwardly towards the first plane 17 and to the longitudinal axis 12 of the shank 11. The cavity 22 can also extend inwardly to a point in the shank 11 along the longitudinal axis 12 beyond the first plane 17. The cavity 22 cooperates with the frustohemispherical outer surface 16 to form therebetween an annular wedge 23, which is generally concentric with the shank's longitudinal axis 12 and terminates with the outermost periphery of the outer surface 16 in an edge 24. In a preferred embodiment, the edge 24 defines a second plane 25 generally normal to the shank's longitudinal axis 12. The edge 24 can be sharp or rounded. Preferably, the edge 24' is rounded. Also, the length 30 of the ramp 21 extending outwardly from the root 19 to the crest 20 of each tooth 18 decreases 30' from the first plane 17 to the second plane 25.

The work-engaging end portion 15 presents the edge 24 of the wedge 23 to the surface of the workpiece to cause it to displace the surface material of the workpiece when the set screw 10 is used. As can be appreciated by those skilled in the art, the end portion 15 is designed to bite into the workpiece's surface material when the set screw 10 is tightened. Upon further tightening, the teeth 18 engage the workpiece. The cavity 22 limits the penetration of the teeth 18 into the workpiece's surface. As noted above, the orientation of the end portion's teeth 18 resists the loosening effects of vibration, and anchors the set screw 10 to the workpiece.

Figure 6:
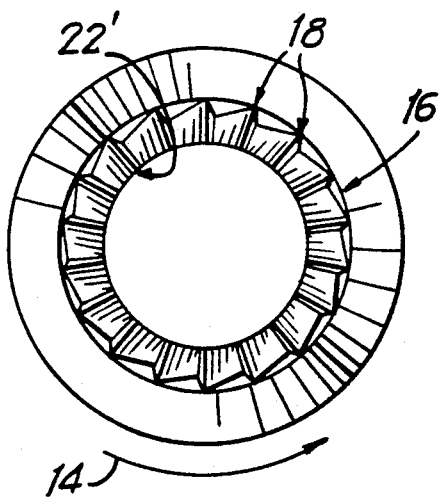
FIG. 6 is a top plan view of another embodiment of the set screw in accordance with the present invention wherein the cavity is polyhedral shaped.

The cavity 22 can have various configurations. For example, the cavity 22 can be conical in shape, having its largest diameter 26 equal to and coterminous with the outermost periphery of the frustohemispherical outer surface 16. The included angle 27 of the conical cavity can be from about 90° to about 130° and, preferably, the included angle 27 is 90°. Another cavity configuration that can be utilized in accordance with the present invention, is a cavity 22' shown in FIG. 6 that is generally polyhedral in shape, and formed by plane faces having its largest diameter 26 equal to and coterminous with the outermost periphery of the frustohemispherical outer surface 16.

Advantageously, the cavity 22 can be of the type illustrated in FIG. 3 in which the cavity 22 is defined by a first portion 28 immediately interior to the outermost portion of the work-engaging end portion 15. This first portion 28 is comprised of a cylindrical wall concentric with the shank's longitudinal axis 12. This type of cavity 22 can be further defined by a second portion 29 interior to the cylindrical first portion 28. The second portion 29 is concentric with the shank's longitudinal axis 12 and it is generally conical in shape, having its largest diameter 26 equal to and coterminous with the innermost periphery of the cylindrical first portion 28. The above-mentioned cavity configurations are described in U.S. Pat. No. 4,764,068, Crispell, the text of which is incorporated by reference herein.

Figure 4:
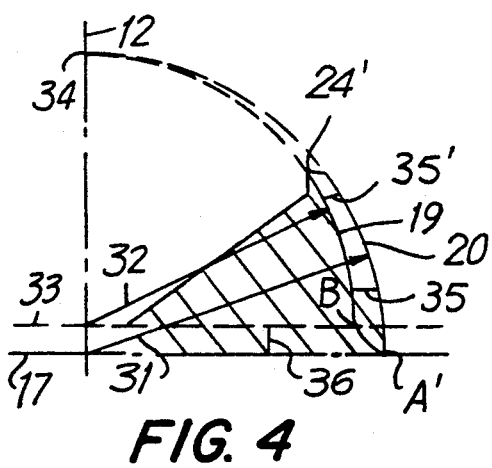
FIG. 4 is an exaggerated schematic cross sectional view taken along 4—4 of FIG. 2 illustrating a tooth in accordance with the present invention.
Figure 5:
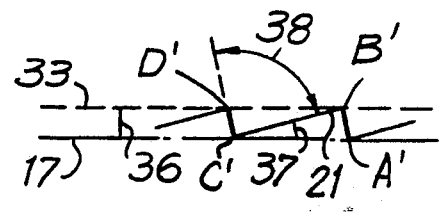
FIG. 5 is an exaggerated schematic view taken along 5—5 of FIG. 3 illustrating the tooth profile of the serrations formed on the set screw in accordance with the present invention.

Details of the teeth in a preferred embodiment of the present invention are illustrated in FIGS. 4 and 5. Common points of reference A', B', C' and D' for a tooth in FIGS. 2 through 5 assist in understanding the tooth's dimensional details. FIG. 4 shows an exaggerated schematic cross sectional view taken along 4—4 of FIG. 2. A first radius 31 defines the crest 20 of the tooth, and the first radius 31 terminates at the first plane 17 normal to the shank's longitudinal axis 12. A second radius 32 defines the root 19 of the adjoining tooth, and the second radius 32 terminates at another plane 33 normal to the shank's longitudinal axis 12 and parallel to the first plane 17. The difference between the first radius 31 and the second radius 32 is shown as the distance 36 in FIGS. 4 and 5. The radii would meet at point 34 on the shank's longitudinal axis 12 if the first radius 31 and the second radius 32 were extended to the longitudinal axis 12, as illustrated in FIG. 4. FIG. 4 also illustrates that the depth 35 of each tooth or serration decreases 35' towards the edge 24 or outermost periphery of the frustohemispherical outer surface.

FIG. 5 shows an exaggerated schematic view of the tooth profile taken along 5—5 of FIG. 3. In FIG. 5, the root B', ramp 21, and crest C' of a tooth are shown, along with the crest A' and root D' of adjoining teeth. The angle 37 between the ramp 21 of the tooth and a line intersecting the crest C' of the tooth and the crest A' of the adjoining tooth in the first plane 17 can be about 6° to about 15° and, preferably, the angle is 15°. Furthermore, the internal angle 38 between the crest C' wall and the ramp 21 is approximately 90°.

Advantageously, the work-engaging end portion of the present invention can be formed by a forging process at low pressure. Since the normal high production forging methods known in the art require that such a work-engaging end portion be impressed on the screw blank by tooling in the bed of the forging machine, a work-engaging end portion had to be developed at minimum pressure since friction on the wall of the die absorbs some of the forging force as the screw's length increases. Therefore, the available pressure at the point of the blank is dependent on product length. A work-engaging end portion configuration that can be forged at low pressure allows a greater range of lengths to be forged. The configuration of the present invention utilizes an extrusion die design concept for the external shape. In order to reduce pressure further, the preform utilized, which is subsequently extruded, has a cavity to facilitate the inward collapse during extrusion.

Furthermore, the forged edge of the work-engaging end portion can be rounded, which has the potential for performing better than a machined sharp edge because the outer surface is work hardened instead of cut. Moreover, the serrations of the present invention are stronger at the edge where stress is high than on the side of the outer surface because the serration depth increases away from the edge. This allows the serrations to engage more of the mating surface of the workpiece when the serrations penetrate deep into the mating surface. The edge also remains more durable because the serration depth is small at the cavity edge. The serration penetration further works in conjunction with the cavity design. The cavity limits the penetration of the serrations into the mating surface. Additionally, the rounded work-engaging end portion or cup-point configuration of the present invention allows its cup-point to be shorter than the straight knurl cup-point known in the prior art. Therefore, more threads on the shank are closer to the cup-point when compared to a straight knurl cup-point having the same cup diameter and point diameter. This is an advantage when the set screw's length is less than its diameter since more collar thread engagement prevents the screw from stripping the collar's threads in such an application.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A set screw comprising:
a shank having external threads;
a work-engaging end portion integrally formed at one end of the shank, said work-engaging end portion having a frustohemispherical outer surface comprising a plurality of circumferentially spaced serrations in the form of teeth, said serrations being radially disposed on the other surface in relation to the shank's longitudinal axis, each of said teeth comprising a ramp extending outwardly from a root to a crest thereof, said ramp being inclined in a direction which is opposite to the direction of rotation of engaging the set screw in a workpiece, said outer surface having the same longitudinal axis as said shank and a larger diameter equal to the diameter of, and coterminous with, said shank having external threads; and
a cavity formed in the outer extremity of the work-engaging end portion, said cavity cooperating with the frustohemispherical outer surface to form therebetween an annular wedge.

2. The set screw according to claim 1 wherein said work-engaging end portion is formed by a forging process.

3. The set screw according to claim 1 wherein said teeth are curved and equally spaced about the frustohemispherical outer surface.

4. The set screw according to claim 1 wherein said cavity formed in the work-engaging end portion extends inwardly to a point in the shank beyond the work-engaging end portion.

5. The set screw according to claim 1 wherein said cavity is generally conical in shape, having its largest diameter equal to and coterminous with the outermost periphery of the frustohemispherical outer surface.

6. The set screw according to claim 1 wherein said cavity is comprised of at least three plane faces, having its largest diameter equal to and coterminous with the outermost periphery of the frustohemispherical outer surface.

7. The set screw according to claim 1 wherein said cavity is defined by a first portion immediately interior to the outermost portion of the work-engaging end portion and comprising a generally cylindrical wall concentric with the longitudinal axis of the shank.

8. The set screw according to claim 7 wherein said cavity is further defined by a second portion interior to the cylindrical first portion, said second portion being concentric with the longitudinal axis of the shank and being generally conical in shape, having its largest diameter equal to and coterminous with the innermost periphery of the cylindrical first portion.

9. A set screw comprising:
a shank having external threads;
a work-engaging end portion integrally formed at one end of the shank, said work-engaging end portion having a frustohemispherical outer surface comprising a plurality of circumferentially spaced serrations in the form of teeth, each of said teeth comprising a ramp extending outwardly from a root to a crest thereof, said ramp being inclined in a direction which is opposite to the direction of rotation of engaging the set screw in a workpiece, and a cavity formed in the outer extremity of the work-engaging end portion, said cavity cooperating with the frustohemispherical outer surface to form therebetween an annular wedge, wherein the depth of each serration decreases towards the outermost periphery of the frustohemispherical outer surface.

10. A set screw adapted to engage a workpiece comprising:

a shank having a longitudinal axis and having external threads along a substantial portion of the shank's length, said threads defining a direction of rotation of engaging the set screw in the workpiece;

a work-engaging end portion integrally formed by a forging process at one end of the shank, said work-engaging end portion having a frustohemispherical outer surface wherein the intersection of the outer surface and the shank defines a first plane normal to the shank's longitudinal axis, said outer surface comprising a plurality of circumferentially spaced serrations in the form of teeth, said serrations being radially disposed on the outer surface in relation to the shank's longitudinal axis, each of said teeth comprising a ramp extending outwardly from a root to a crest thereof, said ramp being inclined outwardly in a direction which is opposite to the direction of rotation of engaging the set screw in the workpiece, and a cavity formed in the outer extremity of the work-engaging end portion and generally extending inwardly to the longitudinal axis of the shank, said cavity cooperating with the frustohemispherical outer surface to form therebetween an annular wedge concentric with the longitudinal axis of the shank and terminating with the outermost periphery of the frustohemispherical outer surface in an edge wherein said edge defines a second plane normal to the shank's longitudinal axis, whereby said teeth facilitate imbedding of the set screw in the workpiece when the set screw is rotated to engage the workpiece and said teeth deter loosening of the set screw after engagement with the workpiece, wherein said edge is rounded.

11. A set screw adapted to engage a workpiece comprising:

a shank having a longitudinal axis and having external threads along a substantial portion of the shank's length, said threads defining a direction of rotation of engaging the set screw in the workpiece;

a work-engaging end portion integrally formed by a forging process at one end of the shank, said work-engaging end portion having a frustohemispherical outer surface wherein the intersection of the outer surface and the shank defines a first plane normal to the shank's longitudinal axis, said outer surface comprising a plurality of circumferentially spaced serrations in the form of teeth, said serrations being radially disposed on the outer surface in relation to the shank's longitudinal axis, each of said teeth comprising a ramp extending outwardly from a root to a crest thereof, said ramp being inclined outwardly in a direction which is opposite to the direction of rotation of engaging the set screw in the workpiece, and a cavity formed in the outer extremity of the work-engaging end portion and generally extending inwardly to the longitudinal axis of the shank, said cavity cooperating with the frustohemispherical outer surface to form therebetween an annular wedge concentric with the longitudinal axis of the shank and terminating with the outermost periphery of the frustohemispherical outer surface in an edge wherein said edge defines a second plane normal to the shank's longitudinal axis, whereby said teeth facilitate imbedding of the set screw in the workpiece when the set screw is rotated to engage the workpiece and said teeth deter loosening of the set screw after engagement with the workpiece, wherein the length of the ramp extending outwardly from the root to the crest of each tooth decreases from the first plane to the second plane.

12. A set screw adapted to engage a workpiece comprising:

a shank having a longitudinal axis and having external threads along a substantial portion of the shank's length, said threads defining a direction of rotation of engaging the set screw in the workpiece;

a work-engaging end portion integrally formed by a forging process at one end of the shank, said work-engaging end portion having a frustohemispherical outer surface wherein the intersection of the outer surface and the shank defines a first plane normal to the shank's longitudinal axis, said outer surface comprising a plurality of circumferentially spaced serrations in the form of teeth, said serrations being radially disposed on the outer surface in relation to the shank's longitudinal axis, each of said teeth comprising a ramp extending outwardly from a root to a crest thereof, said ramp being inclined outwardly in a direction which is opposite to the direction of rotation of engaging the set screw in the workpiece, and a cavity formed in the outer extremity of the work-engaging end portion and generally extending inwardly to the longitudinal axis of the shank, said cavity cooperating with the frustohemispherical outer surface to form therebetween an annular wedge concentric with the longitudinal axis of the shank and terminating with the outermost periphery of the frustohemispherical outer surface in an edge wherein said edge defines a second plane normal to the shank's longitudinal axis, whereby said teeth facilitate imbedding of the set screw in the workpiece when the set screw is rotated to engage the workpiece and said teeth deter loosening of the set screw after engagement with the workpiece, wherein the angle between said ramp of each tooth and a line intersecting the crest of the tooth and the crest of the adjoining tooth in the first plane is about 6° to about 15°.

13. A set screw adapted to engage a workpiece comprising:

a shank having a longitudinal axis and having external threads along a substantial portion of the shank's length, said threads defining a direction of rotation of engaging the set screw in the workpiece;

a work-engaging end portion integrally formed by a forging process at one end of the shank, said work-engaging end portion having a frustohemispherical outer surface wherein the intersection of the outer surface and the shank defines a first plane normal to the shank's longitudinal axis, said outer surface comprising a plurality of circumferentially spaced serrations in the form of teeth, said serrations being radially disposed on the outer surface in relation to the shank's longitudinal axis, each of said teeth comprising a ramp extending outwardly from a root to a crest thereof, said ramp being inclined outwardly in a direction which is opposite to the direction of rotation of engaging the set screw in the workpiece, said outer surface having the same longitudinal axis as said shank and a larger diameter equal to the diameter of, and coterminous with, said shank having external threads, and a cavity formed in the outer extremity of the work-engaging end portion and generally extending inwardly to the longitudinal axis of the shank, said cavity cooperating with the frustohemispherical outer surface to form therebetween an annular wedge concentric with the longitudinal axis of the shank and terminating with the outermost periphery of the frustohemispherical outer surface in an edge wherein said edge defines a second plane normal to the shank's longitudinal axis, said cavity being defined by a first portion immediately interior to the outermost portion of the work-engaging end portion and comprising a generally cylindrical wall concentric with the longitudinal axis of the shank, and said cavity being further defined by a second portion interior to the cylindrical first portion, said second being concentric with the longitudinal axis of the shank and being generally conical in shape, having its largest diameter equal to and coterminous with the innermost periphery of the cylindrical first portion, whereby said teeth facilitate imbedding of the set screw in the workpiece when the set screw is rotated to engage the workpiece and said teeth deter loosening of the set screw after engagement with the workpiece.

14. A set screw adapted to engage a workpiece comprising:

a shank having a longitudinal axis and having external threads along a substantial portion of the shank's length, said threads defining a direction of rotation of engaging the set screw in the workpiece;

a work-engaging end portion integrally formed by a forging process at one end of the shank, said work-engaging end portion having a frustohemispherical outer surface wherein the intersection of the outer surface and the shank defines a first plane normal to the shank's longitudinal axis, said outer surface comprising a plurality of circumferentially spaced serrations in the form of teeth, said serrations being radially disposed on the outer surface in relation to the shank's longitudinal axis, each of said teeth comprising a ramp extending outwardly from a root to a crest thereof, said ramp being inclined outwardly in a direction which is opposite to the direction of rotation of engaging the set screw in the workpiece, said outer surface having the same longitudinal axis as said shank and a larger diameter equal to the diameter of, and coterminous with, said shank having external threads, and a cavity formed in the outer extremity of the work-engaging end portion and generally extending inwardly to the longitudinal axis of the shank, said cavity cooperating with the frustohemispherical outer surface to form therebetween an annular wedge concentric with the longitudinal axis of the shank and terminating with the outermost periphery of the frustohemispherical outer surface in an edge wherein said edge defines a second plane normal to the shank's longitudinal axis, whereby said teeth facilitate imbedding of the set screw in the workpiece when the set screw is rotated to engage the workpiece and said teeth deter loosening of the set screw after engagement with the workpiece.

15. The set screw according to claim 14 wherein said cavity formed in the work-engaging end portion extends inwardly to a point in the shank beyond the first plane.

16. The set screw according to claim 14 wherein said cavity is conical in shape, having its largest diameter equal to and coterminous with the outermost periphery of the frustohemispherical outer surface.

17. The set screw according to claim 16 wherein the included angle of the conical cavity is from about 90° to about 130°.

18. The set screw according to claim 17 wherein said included angle of the conical cavity is 90°.

19. The set screw according to claim 14 wherein said cavity is comprised of at least three plane faces, having its largest diameter equal to and coterminous with the outermost periphery of the frustohemispherical outer surface.

20. The set screw according to claim 14 wherein said cavity is defined by a first portion immediately interior to the outermost portion of the work-engaging end portion and comprising a cylindrical wall concentric with the longitudinal axis of the shank, and said cavity is further defined by a second portion interior to the cylindrical first portion, said second portion being concentric with the longitudinal axis of the shank and being generally conical in shape, having its largest diameter equal to and coterminous with the innermost periphery of the cylindrical first portion.

* * * * *